(12) United States Patent
Cheng

(10) Patent No.: US 7,031,760 B2
(45) Date of Patent: Apr. 18, 2006

(54) HOUSING OF ELECTRONIC PRODUCT

(75) Inventor: Yung-Fa Cheng, Taiepi Shien (TW)

(73) Assignee: Quanta Computer, Inc., Taoyuan Shein (TW)

( * ) Notice: Subject to any disclaimer, the term of this patent is extended or adjusted under 35 U.S.C. 154(b) by 398 days.

(21) Appl. No.: 10/615,826

(22) Filed: Jul. 10, 2003

(65) Prior Publication Data

US 2004/0248626 A1   Dec. 9, 2004

(30) Foreign Application Priority Data

Jun. 5, 2003   (TW)   .............................. 92115301 A

(51) Int. Cl.
  *H04B 1/38*   (2006.01)
(52) U.S. Cl. .................. 455/575.1; 455/90.3; 455/348
(58) Field of Classification Search ............. 455/550.1, 455/575.8, 90.3, 347, 348, 351, 566; 379/433.01, 379/433.11, 434
See application file for complete search history.

(56) References Cited

U.S. PATENT DOCUMENTS

| | | | | |
|---|---|---|---|---|
| 5,461,672 A | * | 10/1995 | Enokido et al. ....... | 379/433.02 |
| 5,535,437 A | * | 7/1996 | Karl et al. ................ | 455/575.1 |
| 5,848,152 A | * | 12/1998 | Slipy et al. ............ | 379/433.13 |
| 6,006,074 A | * | 12/1999 | De Larminat et al. ... | 455/575.1 |
| 6,535,750 B1 | * | 3/2003 | Van Gen ..................... | 455/348 |
| 6,563,927 B1 | * | 5/2003 | Mote et al. ............ | 379/433.11 |
| 6,950,686 B1 | * | 9/2005 | Won ........................ | 455/575.3 |

* cited by examiner

*Primary Examiner*—Quochien B. Vuong
(74) *Attorney, Agent, or Firm*—Rabin & Berdo, PC

(57) ABSTRACT

A housing of an electronic product is disclosed. The housing uses such as a battery as a key member for replacing the housing of such as a mobile phone, i.e. the housing thereof can be changed briefly after the key member is removed. The housing is mainly composed of an outer housing member, an inner housing member, an elastic member and a key member, wherein a push-button member and a background element can be installed between the outer housing member and the inner housing member. The mechanism of the housing is to insert a protrusion portion of the key member into penetrating holes of the outer and inner housing members respectively; and to insert a protrusion portion of the inner housing member into a penetrating hole of the outer housing member, for fastening the outer and inner housing members.

14 Claims, 4 Drawing Sheets

HOUSING OF ELECTRONIC PRODUCT

FIELD OF THE INVENTION

The present invention relates to a housing of an electronic product, and more particularly, to a housing of a mobile phone, the housing using a battery as a key member for dismantling and assembling.

BACKGROUND OF THE INVENTION

While consumers' demands are changed day by day, more and more electronic products all have been emphasized on the capability of replacing the housings, thereby allowing consumers to vary the appearance of the electronic products in accordance with their individual requirements. On the other hand, since the DIY (Do It Yourself) has become a major trend in the consumer market, it is quite an important issue about how to allow consumers to briefly dismantle the product housing for product maintenance or upgrade, which further is one of the major factors affecting the market competitiveness.

Currently, most of the housing-replacing tasks are performed by professional personals, wherein the steps thereof are so complicated to cause errors easily. Generally, consumers can only replace panels for the mobile phones having the special designs, but very few existing mobile phones can allow the consumers to easily replace the entire housings. Most of the mobile phones existing in the market achieve the function of housing-replacing by insetting tenons into mortises, thus combining the upper and lower housings by using the elasticity of housing material. However, extra consideration has to be taken for selecting the material forming the aforementioned type of mobile phone and making the design of the tenons and mortises therein, thus resulting in the increase of production cost. Meanwhile, when consumers try to separate the combined tenons from the mortises, it is very likely to break the tenons or the housing due to excessive force exerted.

Further, conventional mobile phones use the laser-printing process for fabricating the labels, such as numbers or function key label, shown on the surfaces of the push-buttons, and the cost thereof is quite high. Since the design of the surface of the housing is determined by the makers, consumers cannot design the surface of the housing in accordance with their favorites. The consumers have to buy various panels or housings provided by the makers, and then can only pick one of those panels or housings for replacing the housing of mobile phone. Frequently, the individual needs of the consumers still cannot be satisfied even after the consumers have simultaneously owned a lot of groups of panels or housings, thus wasting a lot of money and material.

Hence, there is a need to develop a housing of an electronic product, thereby simplifying the steps of replacing the housing, thus lowering the production cost and satisfying the individual needs.

SUMMARY OF THE INVENTION

It is an object of the present invention to provide a housing of an electronic product by using a battery as the key member for enabling the inner and outer housing members to be combined together, thereby simplifying the steps of replacing the housing.

It is the other object of the present invention to provide a housing of an electronic product, wherein an ordinary printing method can be used to substitute the laser-printing process for fabricating the labels shown on the surfaces of the push-buttons, thereby lowering the production cost, and further allowing consumers to design the surface of the housing freely so as to satisfy their individual needs.

According to the aforementioned objects of the present invention, the present invention provides a housing of an electronic product, such as a mobile phone.

According to a preferred embodiment of the present invention, a housing of an electronic product comprises: an outer housing member; a background element; a push-button member installed on the background element; an inner housing member, wherein the inner housing member is installed on the push-button member; an elastic member, wherein the elastic member is installed on one side of an inner-housing recession portion opposite to a second key penetrating hole; and a key member installed in the inner-housing recession portion.

The outer housing member has: an outer-housing recession portion; a first key penetrating hole and an outer-housing penetrating hole respectively located on two opposite sides of the outer-housing recession portion; and a plurality of first push-button penetrating holes located on the bottom of the outer-housing recession portion. The background element is installed in the outer-housing recession portion, and has a plurality of second push-button penetrating holes corresponding to the first push-button penetrating holes.

The push-button member has a push-button base, and a plurality of protrusion elements, wherein the protrusion elements are exposed from an outer-housing surface of the outer housing member opposite to the opening direction of the outer-housing recession portion after respectively penetrating through the second push-button penetrating holes and the first push-button penetrating holes.

The inner housing member has the inner-housing recession portion; a second key penetrating hole and an inner-housing protrusion portion respectively located on two opposite sides of the inner housing member, wherein the second key penetrating hole is located inside the inner-housing recession portion, and the inner-housing protrusion portion penetrates into the outer-housing penetrating hole for fastening the inner housing member and the outer housing member; and an inner-housing recession bottom located on an inner-housing surface opposite to the opening direction of the inner-housing recession portion, for accommodating the push-button base.

Two opposite sides of the key member have respectively: a first key protrusion portion and a second key protrusion portion, wherein the first key protrusion portion penetrated through the second key penetrating hole and into the first key penetrating hole, for fastening the inner housing member and the outer housing member, and the second key protrusion portion compressed the elastic member so as to reinforce the fastening of the key member to the inner-housing recession portion, wherein the elastic member is used for easily taking out the key member.

Hence, with the application of the present invention, the steps of replacing a housing can greatly simplified; the production cost can be lowered by substituting the laser-printing process with an ordinary printing method for fabricating the labels shown on the surfaces of the push buttons; and consumers can design the surface of the housing freely so as to satisfy their individual needs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
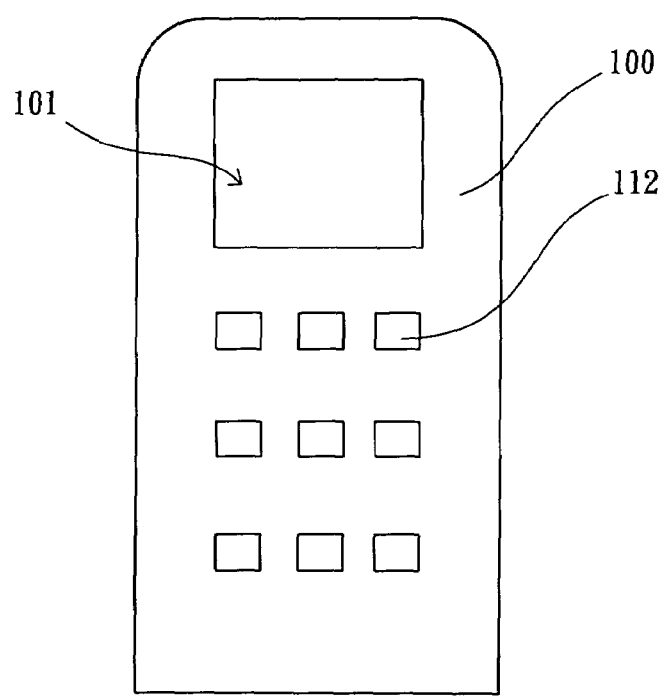
FIG. 1A is a schematic top view of a housing of an electronic product, according to a preferred embodiment of the present invention.
Figure 1B:
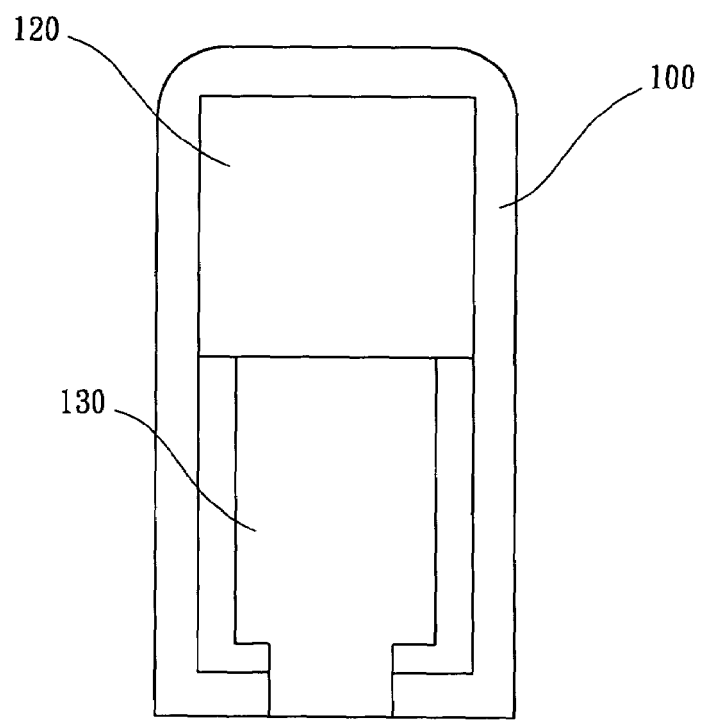
FIG. 1B is a schematic bottom view of the housing of the electronic product, according to the preferred embodiment of the present invention.

Referring to FIG. 1A and FIG. 1B, FIG. 1A is a schematic top view of a housing of an electronic product, according to a preferred embodiment of the present invention; and FIG. 1B is a schematic bottom view of the housing of the electronic product, according to the preferred embodiment of the present invention. According to the present invention, an inner housing member 120 is disposed in an outer housing member 100, and a key member 130 thereof is installed in a recession portion of the inner housing member 120, wherein the key member 130 can be such as a battery. The outer housing member 100 has a display opening 101 used for installing a display screen, and has a plurality of openings used for exposing a plurality of protrusion elements 112.

Figure 2:
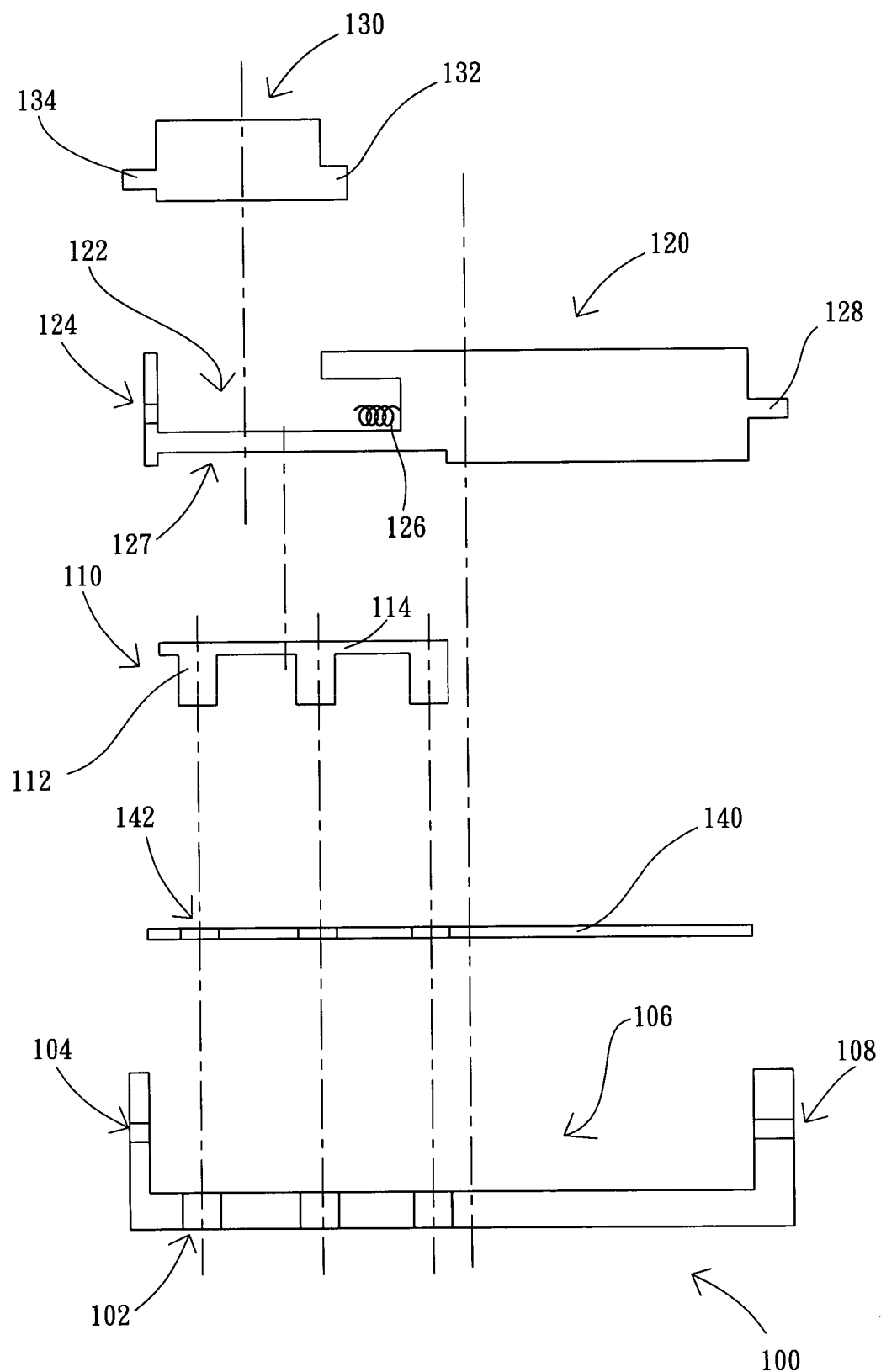
FIG. 2 is a schematic explosive view of the housing of the electronic product, according to the preferred embodiment of the present invention.

Referring FIG. 2, FIG. 2 is a schematic explosive view of the housing of the electronic product, according to the preferred embodiment of the present invention. According to the present invention, the housing of the electronic product is mainly composed of the outer housing member 100; the inner housing member 120 installed in the outer housing member 100; an elastic member 126 (such as a spring) installed in the inner housing member 120; and the key member 130 installed in the recession portion 122 of the inner housing member 120. A background element 140 and a push-button member 110 may be installed between the outer housing member 100 and the inner housing member 120, wherein the inner housing member 120 is installed on the push-button member 110 and a portion of the background element 140.

The outer housing member 100 has the following parts: an outer-housing recession portion 106; a first key penetrating hole 104 and an outer-housing penetrating hole 108 respectively located on two opposite sides of the outer-housing recession portion 106; and a plurality of first push-button penetrating holes 102 located on the bottom of the outer-housing recession portion 106 penetrating through the surface of the outer housing member 100, wherein the background 140 is installed in the outer-housing recession portion 106, and has a plurality of second push-button penetrating holes 142 corresponding to the plurality of first push-button penetrating holes 102. The push-button member 110 has a push-button base 114 and a plurality of protrusion elements 112 (such as the push buttons of a mobile phone) located on said push-button base 114, wherein the protrusion elements 112 are exposed from an outer-housing surface of the outer housing member 100 opposite to the opening direction of the outer-housing recession portion 106 after respectively penetrating through the first push-button penetrating holes 102 and the second push-button penetrating holes 142. The background element 140 can be a sheet of paper, on which users can print labels, patterns, etc. arbitrarily, and thereafter those printings can be shown via the transparent portion of the outer-housing surface of the outer housing member 100, thereby satisfying the individual needs of the users. The outer housing member 100 can be the housing of all or partial transparent.

The inner housing member 120 has an inner-housing recession portion 122; a second key penetrating hole 124 and an inner-housing protrusion portion 128 respectively located on two opposite sides of the inner housing member 120, wherein the second key penetrating hole 124 is located on one side of the inner-housing recession portion 122, and the inner-housing protrusion portion 128 penetrates into the outer-housing penetrating hole 108 so as to fasten one side of the inner housing member 120 on the outer housing member 100; and an inner-housing recession bottom 127 located on an inner-housing surface opposite to the opening direction of the inner-housing recession portion 122, wherein the inner-housing recession bottom 127 is used for accommodating the push-button base 114. Moreover, an elastic member 126 is installed on another side of the inner-housing recession portion 122 opposite to the second key penetrating hole 124.

There are a first key protrusion portion 134 and a second key protrusion portion 132 respectively formed on two opposite sides of the key member 130. When the key member 130 is installed in the inner-housing recession portion 122, the first key protrusion portion 134 penetrates the second key penetrating hole 124 and the first key penetrating hole 104, so as to fasten another side of the inner member 120 opposite to the inner-housing protrusion portion 128 on the outer member 100, and the second key protrusion portion 132 compresses the elastic member 126 so as to reinforce the fastening of the key member 130 to the inner-housing recession portion 122, thereby increasing the combination tightness of the inner housing member 120 and the outer housing member 100. On the other hand, the elastic member 126 is used for allowing the key member 130 to be taken out of the inner-housing recession portion 122 easily. It is worthy to be noted that the key member 130 can be such as a battery of mobile phone or any other applicable components. As to other electronic components, they can be installed in the proper positions between the inner housing member 120 and the outer housing member 100.

To sum up, according to the present invention, a housing of an electronic product does not need to use such as screws or tenons and mortises to assembly the housing, but use a battery of mobile phone (the key member 130) as the key component for dismantling or assembling the housing. In other words, the assembly of the housing can be completed by first inserting the inner-housing protrusion 128 into the outer-housing penetrating hole 108; then placing the key member 130 into the inner-housing recession portion 122; letting the first key protrusion portion 134 penetrate into the second key penetrating hole 124 and the first key penetrating hole 104 respectively; and holding the elastic member 126 against the second key protrusion portion 132, wherein the force and the reaction force between the key member 130 and the elastic member 126 can tightly combine the inner housing member 120 and the outer housing member 100.

Figure 3A:
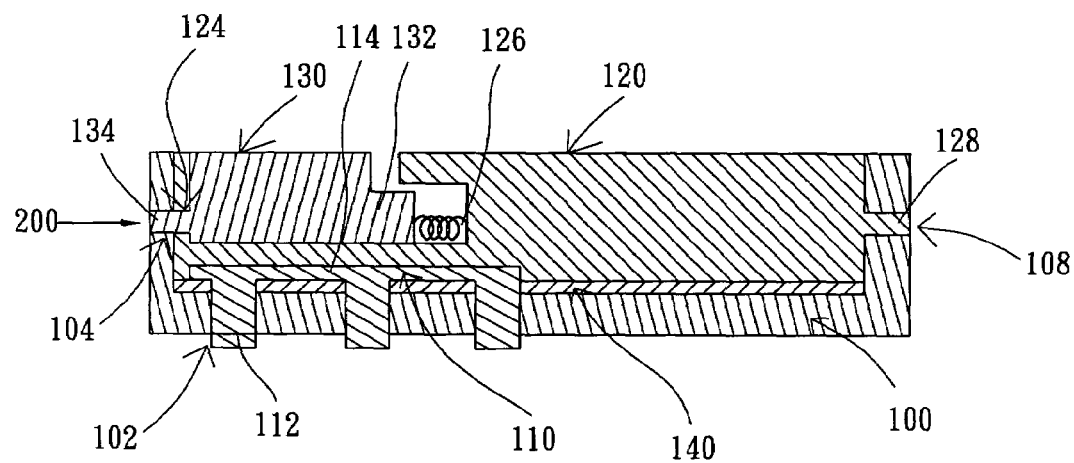
FIG. 3A to FIG. 3D are schematic cross-sectional views showing the steps of dismantling the housing of the electronic product, according to the preferred embodiment of the present invention.
Figure 3B:
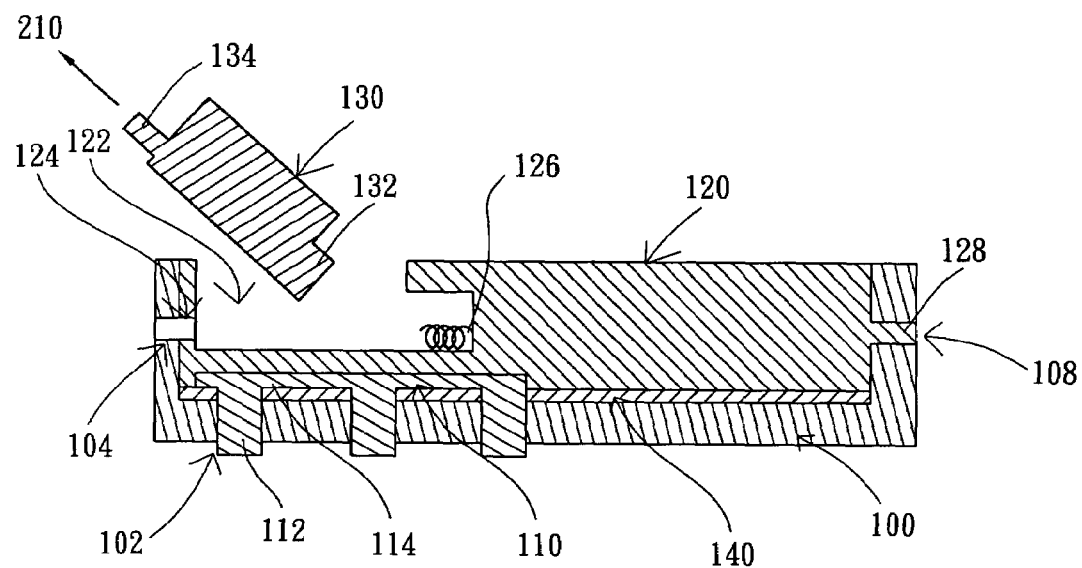
Figure 3C:
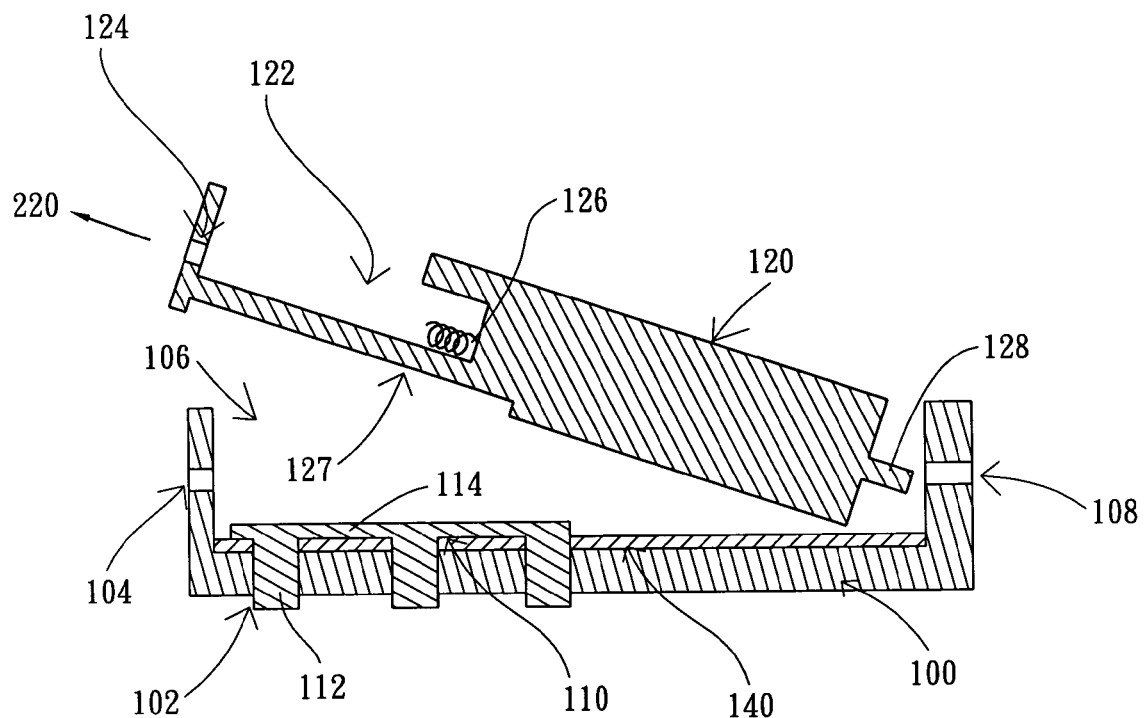
Figure 3D:
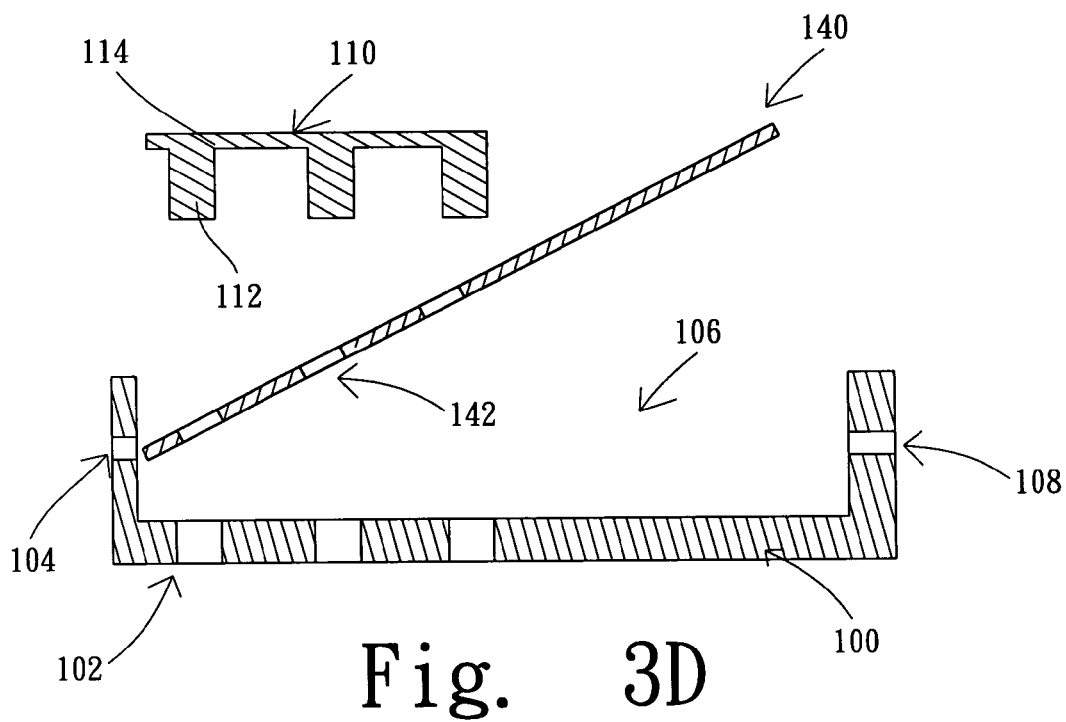

Further, referring FIG. 3A to FIG. 3D, FIG. 3A to FIG. 3D are schematic cross-sectional views showing the steps of dismantling the housing of the electronic product, according to the preferred embodiment of the present invention. While dismantling the housing, a pushing force 200 is exerted to move the key member 130 towards the elastic member 126 (such as shown in FIG. 3A), thereby set the first key protrusion portion 134 apart from the second key penetrating hole 124 and the first key penetrating hole 104. Thereafter, a pulling force 210 is exerted to take the key member 130 out of the inner-housing recession portion 122 (such as shown in FIG. 3B). Then, a pulling force 220 is exerted to separate the inner-housing protrusion portion 128 of the inner housing member 120 from the outer-housing penetrating hole 108 (such as shown in FIG. 3C). After the inner housing member 120 is taken out of the outer-housing recession portion 106, the push-button member 110 and the background element 140 can be separated from the outer-housing recession portion 106, so that the job for dismantling the housing is completed (such as shown in FIG. 4D).

It can be known from the aforementioned preferred embodiment of the present invention, the advantages of applying the present invention are: greatly simplifying the steps of replacing the housing; lowering the production cost by using an ordinary printing method to substitute the laser-printing process for fabricating the background element for showing the labels of the push-buttons; allowing consumers to design the surface of the housing freely so as to satisfy their individual needs; and having highly industrial value since the hosing has a strong integrated structure and is easily fabricated without the limitation of material.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A housing of an electronic product, comprising:
    an outer housing member, having:
        an outer-housing recession portion; and
        a first key penetrating portion and an outer-housing penetrating portion, respectively located on two opposite sides of said outer-housing recession portion;
    an inner housing member, having:
        an inner-housing recession portion; and
        a second key penetrating portion and an inner-housing protrusion portion, respectively located on two opposite sides of said inner housing member, wherein said second key penetrating portion is located inside said inner-housing recession portion, and said inner-housing protrusion portion penetrates into said outer-housing penetrating portion for fastening said inner housing member and said outer housing member;
    an elastic member, installed on one side of said inner-housing recession portion opposite to said second key penetrating portion; and
    a key member, installed in said inner-housing recession portion, comprising:
        a first key protrusion portion and a second key protrusion portion respectively located on two opposite sides of said key member, wherein said first key protrusion portion penetrates through said second key penetrating portion and into said first key penetrating portion, for fastening said inner housing member and said outer housing member, and said second key protrusion portion compressed said elastic member so as to reinforce the fastening of said key member to the inner-housing recession portion, wherein the elastic member is used for easily taking out the key member.

2. The housing according to claim 1, wherein said outer housing member has a display opening used for installing a display screen.

3. The housing according to claim 1, wherein said outer housing member has a plurality of first push-button penetrating portions located on the bottom of said outer-housing recession portion, and said housing further comprises:
    a push-button member, having a push-button base and a plurality of protrusion elements located on said push-button base, wherein said plurality of protrusion elements are exposed from an outer-housing surface of said outer housing member opposite to the opening direction of said outer-housing recession portion after respectively penetrating through said first push-button penetrating portions.

4. The housing according to claim 3, further comprising:
    a background element, installed in said outer-housing recession portion, wherein said push-button member is installed on said background element, and said inner housing member is installed on said push-button member and a portion of said background element, said background element having:
        a plurality of second push-button penetrating portions, corresponding to said plurality of first push-button penetrating portions, thereby exposing said protrusion elements from said outer-housing surface of said outer housing member after respectively penetrating through said plurality of second push-button penetrating portions.

5. The housing according to claim 3, wherein said inner housing member has:
    an inner-housing recession bottom, located on an inner-housing surface opposite to the opening direction of said inner-housing recession portion, for accommodating said push-button base.

6. The housing according to claim 3, wherein at least one portion of said outer-housing surface is transparent.

7. The housing according to claim 1, wherein said key member is a battery.

8. The housing according to claim 1, wherein said elastic member is a spring.

9. The housing according to claim 1, wherein said electronic product is a mobile phone.

10. A housing of a mobile phone, wherein said housing comprises:
    an outer housing member, having:
        an outer-housing recession portion;
        a first key penetrating portion and an outer-housing penetrating portion, respectively located on two opposite sides of said outer-housing recession portion; and
        a plurality of first push-button penetrating portions located on the bottom of said outer-housing recession portion;
    a background element, installed in said outer-housing recession portion, wherein said background element has a plurality of second push-button penetrating portions, corresponding to said plurality of first push-button penetrating portions;
a push-button member, having
  a push-button base; and
  a plurality of protrusion elements, located on said push-button base, wherein said plurality of protrusion elements are exposed from an outer-housing surface of said outer housing member opposite to the opening direction of said outer-housing recession portion after respectively penetrating through said second push-button penetrating portions and said first push-button penetrating portions;
an inner housing member, installed on said push-button member and a portion of said background element, comprising:
  an inner-housing recession portion;
  a second key penetrating portion and an inner-housing protrusion portion, respectively located on two opposite sides of said inner housing member, wherein said second key penetrating portion is located inside said inner-housing recession portion, and said inner-housing protrusion portion penetrates into said outer-housing penetrating portion for fastening said inner housing member and said outer housing member; and
  an inner-housing recession bottom, located on an inner-housing surface opposite to the opening direction of said inner-housing recession portion, for accommodating said push-button base;
  an elastic member, installed on one side of said inner-housing recession portion opposite to said second key penetrating portion; and
  a key member, installed in said inner-housing recession portion, comprising:
    a first key protrusion portion and a second key protrusion portion respectively located on two opposite sides of said key member, wherein said first key protrusion portion penetrates through said second key penetrating portion and into said first key penetrating portion, for fastening said inner housing member and said outer housing member, and said second key protrusion portion compressed said elastic member so as to reinforce the fastening of said key member to the inner-housing recession portion, wherein the elastic member is used for easily taking out the key member.

11. The housing according to claim 10, wherein at least one portion of said outer-housing surface is transparent.

12. The housing according to claim 10, wherein said outer housing member has a display opening used for installing a display screen.

13. The housing according to claim 10, wherein said key member is a battery.

14. The housing according to claim 10, wherein said elastic member is a spring.

* * * * *